United States Patent
Oxlade et al.

[11] 3,945,235
[45] Mar. 23, 1976

[54] APPARATUS FOR APPLYING A TENSILE LOAD TO A HOLLOW SHAFT

[75] Inventors: Roy Ronald Oxlade; David James Westgarth, both of London, England

[73] Assignee: British Steel Corporation, London, England

[22] Filed: Feb. 27, 1975

[21] Appl. No.: 553,737

[30] Foreign Application Priority Data
Mar. 8, 1974 United Kingdom............... 10554/74

[52] U.S. Cl........................ 72/238; 403/15; 403/31
[51] Int. Cl.²......................................... B21B 31/08
[58] Field of Search........ 72/238, 239; 29/125, 520; 403/31, 15

[56] References Cited
UNITED STATES PATENTS
2,709,373  5/1955  Barron............................ 403/15 X
3,613,429  10/1971  Schwarzenberg et al............. 72/249
3,842,640  10/1974  Schmitt et al..................... 72/238 X
3,851,365  12/1974  Oxlade............................. 29/125

*Primary Examiner*—Milton S. Mehr
*Attorney, Agent, or Firm*—Bacon & Thomas

[57] ABSTRACT

A hydraulically operable device for stretching a hollow roll arbor to slightly reduce the arbor diameter in order to fit rolling sleeves around the arbor. The device includes a rod which is inserted into the hollow arbor and a hydraulically operable piston and cylinder arrangement at one end of the rod to apply a load through the rod to the arbor. A circular split collett extends around the piston and cylinder arrangement and engages at one end in a reaction block which reacts in response to the applied hydraulic pressure and at its other end with the roll arbor. The collett is held to the reaction block and to the arbor by annular rings, so that when a load is applied to the rod, the arbor is stretched longitudinally.

10 Claims, 3 Drawing Figures

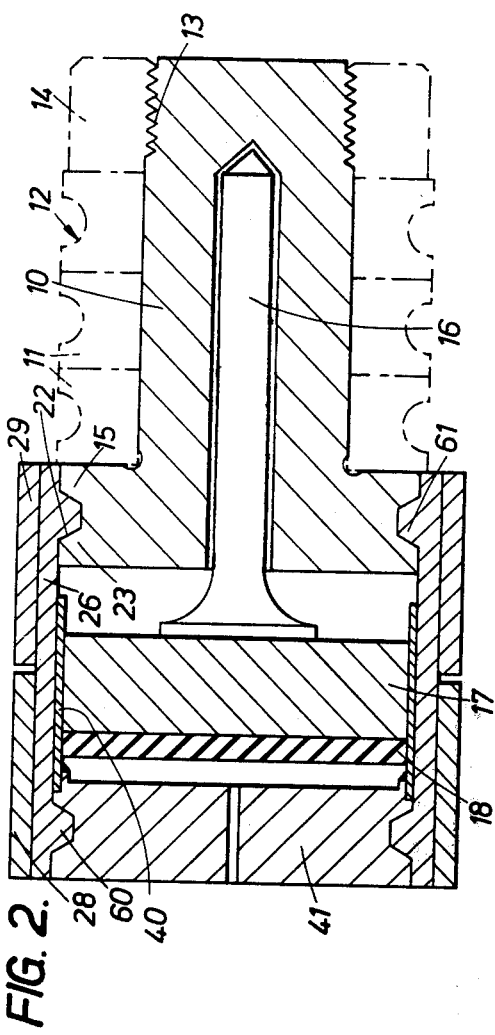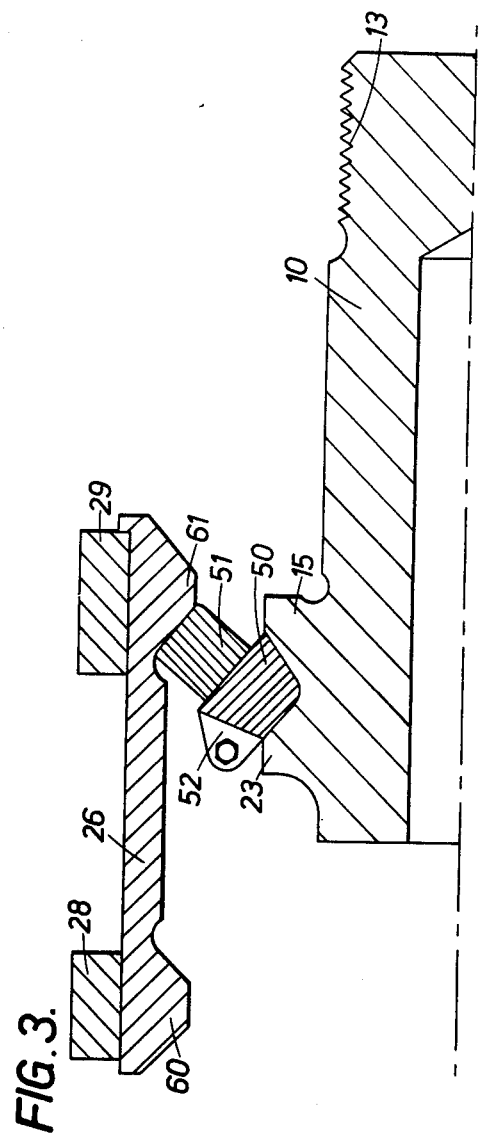

APPARATUS FOR APPLYING A TENSILE LOAD TO A HOLLOW SHAFT

This invention relates to improvements in apparatus for applying a tensile load to a hollow shaft. In particular, the apparatus is suitable for stretching hollow roll arbors and consequently slightly reducing their diameter, so that roll sleeves may be positioned on the arbor whilst the arbor is in a stretched condition. The load applied to the arbor may then be removed so that the sleeves are located radially of the arbor by the subsequent diametral expansion of the arbor.

It has already been proposed to use a hydraulically operable piston and cylinder arrangement to apply a tensile load to a hollow shaft member. Known arrangements include a pressure cap surrounding the piston and to which a hydraulic pump is in use connected. These pressure caps are extremely expensive by virtue of the fact that they are normally manufactured from a solid block of forged steel which subsequently has most of its interior machined away. Furthermore such pressure cap and piston arrangements are useable only for one size of hollow shaft. The pressure cap is conventionally secured to the shaft by a screw thread fitting, and the pressure cap is only useable with that one particular diameter shaft which has the mating thread.

It is an object of the invention to provide a system which can be used for applying a tensile load to hollow shaft members of different diameter.

According to one aspect of the present invention an apparatus is provided for applying a tensile load to a hollow shaft member including, a rod adapted to be inserted in said hollow shaft member to apply the load to the shaft member, a hydraulically operable piston and cylinder arrangement located at one end of the rod, a reaction member spaced from the piston, at least two rigid members adapted at one end to engage with the shaft member and adapted at the other end to engage with the reaction member, and means for holding said rigid members into engagement with the shaft member and reaction member.

The shaft member may have a closed end providing internal abutment means, and accordingly the rod may be adapted to apply the tensile load against the closed end. Suitably, the means for holding the rigid members into engagement with the shaft member and reaction member includes at least one ring member surrounding said rigid members. The ring member may be made of high tensile steel or other suitable resilient material.

The rigid members may extend substantially around the whole of the cylinder. The cylinder may be supported around at least part of its external circumference between rigid members. Alternatively, there may be a space between the cylinder and the rigid members.

The reaction member may comprise two parts, the first part being integral with the cylinder, and the second part supporting the first part so that the reaction to hydraulic pressure is transmitted through the first part to the second part.

The apparatus may include a spacer block adapted to be positioned between the ends of the rigid members adjacent the shaft member and an external projection of the shaft member. There may be a series of spacer blocks in segments adapted to extend substantially around the whole of the outer circumference of the shaft member. The spacer block may be suitably formed in two adjacent parts, one adapted to be positioned radially further outward from the axis of the shaft member than the other.

In the accompanying drawings:

FIG. 2 shows a sectional view of a second embodiment of the present invention, and FIG. 3 shows an incomplete view of a variation of the embodiment of FIG. 1.

In the drawings like reference numbers refer to like parts.

Figure 1:
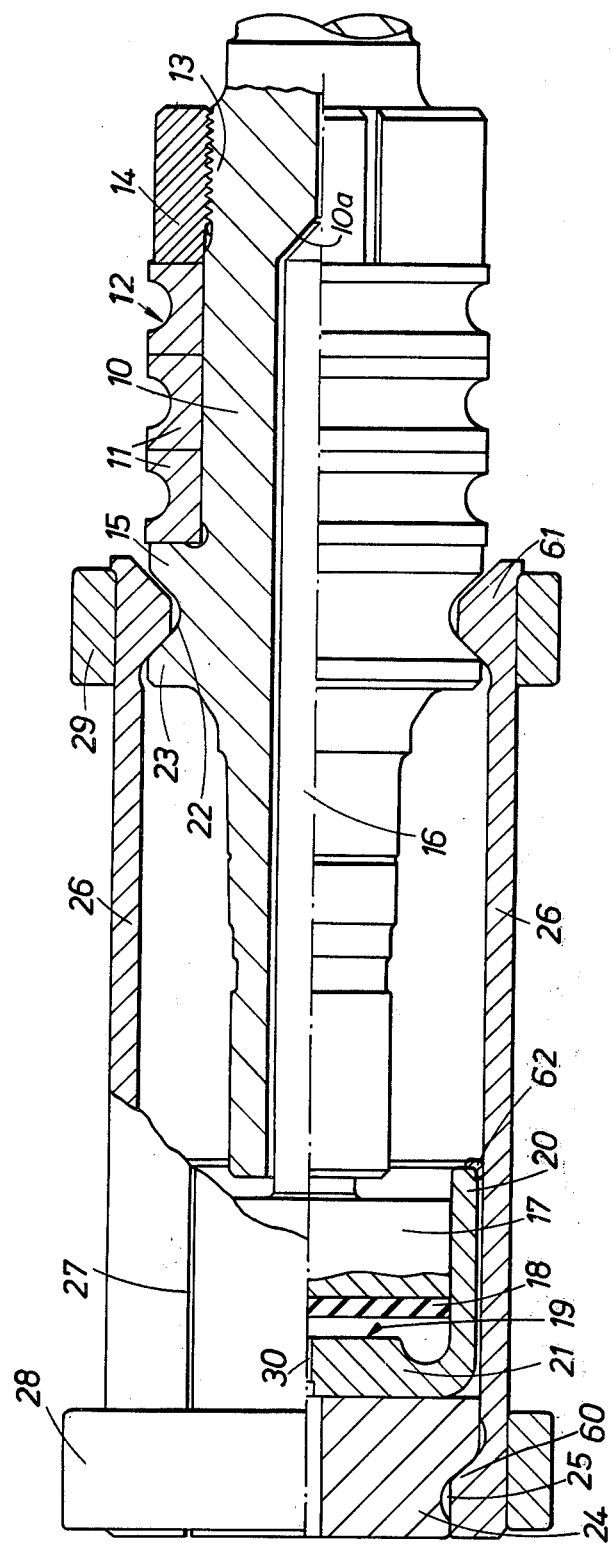
FIG. 1 shows partly in cross-section one embodiment of the present invention.

In FIG. 1 a hollow shaft or roll arbor 10 substantially closed at one end 102 to provide an internal abutment is shown under tensile load. Three annular sleeves 11, each containing a rolling groove 12 suitable for rolling rod, are positioned adjacent one another around the arbor 10 and are located axially of the arbor by a shoulder 15 forming an integral part of the arbor 10. The arbor 10 has an external thread 13 adjacent its closed end, and a cooperating nut 14 is located on thread 13 so that it is hand tight against the closest sleeve 11. On the side of the shoulder 15 distant from the sleeves 11, the arbor 10 has a re-entrant portion 22 and a projection 23 providing an exterior abutment means.

A rod 16 extends through the centre of the hollow arbor 10 and bears against the closed end of the arbor 10. Rod 16 extends from a piston 17 which has a rubber seal 18 (or a conventional piston seal) on its side distant from rod 16. A pressure cap 19, having a hollow cylindrical portion 20 integral with a reaction portion 21, fits over piston 17 so that the piston 17 is moveable within the cylindrical portion 20 of pressure cap 19. The space between seal 18 and the reaction portion 21 of pressure cap 19 contains a hydraulic fluid.

A circular supporting or reaction block 24 is located adjacent the reaction portion 21 of the pressure cap 19. This block 24 has a recessed portion 25 around its perimeter. A series of rigid segmented members 26 extend substantially parallel to rod 16 around the pressure cap 19 and part of the arbor 10. The members 26 at one end have a first projection 60 which engages with the recessed portion 25 of block 24 and at the other end have a second projection 61 which engages with the re-entrant portion 22 and projection 23 of the arbor 10. The members 26 extend as a circular split collett (one split can be seen at 27) around block 24, the pressure cap 19 and the arbor 10 up to the plane where the members 26 engage with the arbor 10. Two rings 28 and 29 respectively hold the members 26 into engagement with the block 24 and the arbor 10 respectively.

To apply a tensile load to the hollow arbor 10 the procedure is as follows. The rod 16, with its associated piston 17 and pressure cap 19 at one end, is located in the hollow portion of the arbor 10. The block 24, segmented members 26 and rings 28 and 29 are then assembled as shown in FIG. 1. A centralising spacer 62 in the form of a complete ring or in segmented pieces fits around the open end of the cylindrical portion 20 of the pressure cap 19, and acts to locate the rod 16 centrally between the segmented members 26. The piston 17 and rod 16 are then subjected to pressure resulting from the introduction of hydraulic fluid under pressure into the space between piston seal 18 and the reaction portion 21 of the pressure cap 19. An inlet 30 in the pressure cap 19 is provided for the attachment of a hydraulic fluid supply means (not shown) of conventional type. The rod 16 applies a tensile load to the arbor 10, since the reaction to the load applied to piston 17 is transmitted through the reaction portion 21 of pressure cap 19, through the supporting block 24 and thence through rigid members 26 to the external projection 23 on arbor 10. This results in the body of the arbor 10, between the projection 23 and the closed end, tending to stretch axially, and thus there is a diametral reduction in this portion of the arbor 10.

Whilst the tensile load is maintained, the sleeves 11 are fitted around the arbor 10 and the nut 14 is hand-tightened against the sleeves 11. The sleeves 11 in an unstressed state have an internal diameter which is slightly greater than the external diameter of the portion of the arbor they are mounted on, in the stressed state.

The pressure of the hydraulic fluid is then released, and the arbor 10 contracts axially and expands radially thereby clamping the sleeves 11 to the arbor 10, and at the same time clamping the nut 14 against the sleeves 11. The apparatus for applying the tensile load can then be dissambled for use with another arbor. If different diameter arbors are to be loaded, interchangeable steel rings 28 and 29 and interchangeable blocks 24 and centralising spacers 62 of different diameters can be available. The same piston 17, pressure cap 19 and rigid members 26 can thus be used for loading different diameter arbors.

In the embodiment of FIG. 2, the pressure cap 19 of the first embodiment is not used. Instead, a cylinder sleeve 40 is supported radially by the rigid members 26, and located axially at one end by seal welding to a reaction block 41. The rigid members 26 are held into engagement with the reaction block 41 and arbor 10 by steel rings 28 and 29 in a similar manner to the embodiment of FIG. 1. The arrangement of FIG. 2 has a special advantage in that it avoids the need for the expensive pressure cap shown in FIG. 1.

In FIG. 3, the rigid members 26 are shown spaced from the arbor 10 by two curved spacer blocks 50 and 51. These spacer blocks 50 and 51 form part of a series of blocks running substantially around the whole of the outer circumference of the arbor 10. The inner block 50 is engaged in the re-entrant portion 22 of the arbor 10 between the shoulder 15 and the projection 23, and has a lug 52 suitable for handling and locating it. The lugs 52 are bolted together to hold the spacer blocks 50 to one another around the circumference of the arbor 10. The outer block 51, which in use, rests on the inner block 50 and engages with the projection 61 of rigid member 26. The use of the spacer blocks 50 and 51 enables the apparatus of FIG. 1 to be used with arbors 10 of different diameter, provided that the block 24 is of sufficiently large diameter to be used with the largest diameter arbor 10 which is envisaged, without the need for spacer blocks 50 and 51. Then, for smaller diameter arbors, inner spacer block 50 may be used alone or in combination with outer spacer blocks 51 of different thickness. The arrangement of FIG. 3 could also be used with the embodiment of FIG. 2, with suitable modification of the projection 61 and its related re-entrant portion 22 on the arbor 10. The use of spacer blocks 50 and 51 obviates the need for supporting blocks 24 of different diameter in the use of the embodiment of FIG. 1 for different diameter arbors. The spacer block arrangement should be substantially as follows to avoid a varied pattern of loading on the rings 28, 29 and spacer blocks 50, 51, and to avoid large overturning moments on spacer blocks 50 and 51:

The loaded faces of arbor projection 23 and rigid member projection 61 should be substantially parallel, the theoretical centre line of the load should pass directly between them approximately perpendicular to the loaded faces, and the load on the faces should be spaced reasonably evenly about this load centre line.

We claim:

1. Apparatus for applying a tensile load to a hollow shaft member having internal abutment means and external abutment means in order to longitudinally stretch said shaft member and reduce the diameter thereof, comprising:
   a. a rod having an inner end which in use is inserted into said hollow shaft member and abutted against said internal abutment means to apply the load to the shaft member,
   b. a piston carried by the other end of the rod which in use extends outside the shaft member,
   c. a cylinder within which said piston is slidably moveable,
   d. a reaction member spaced from but adjacent to the head of the piston in the direction away from said other end of said rod,
   e. at least two rigid members which in use extend externally of said cylinder between said reaction member and the external abutment means on said shaft member, each rigid member being shaped at its ends so as to operably engage respectively the reaction member and the external abutment means on the shaft member,
   f. means for holding the ends of said rigid members into operable, fixed engagement with the shaft member and reaction member, and
   g. means for admitting a hydraulic fluid under pressure into said cylinder between the head of the piston and the reaction member to actuate said piston to thereby apply a tensile load to said shaft member and stretch it longitudinally and to reduce the diameter thereof.

2. Apparatus as claimed in claim 1 in which the rod is adapted to apply the tensile load against a closed end of the shaft member.

3. Apparatus as claimed in claim 1 in which the means for holding the rigid members into operable engagement with the external abutment means on the shaft member and reaction member includes at least one ring member surrounding said rigid members.

4. Apparatus as claimed in claim 1 in which the cylinder is supported around at least part of its external circumference between the rigid members.

5. Apparatus as claimed in claim 1 in which the rigid members extend substantially around the whole of the cylinder.

6. Apparatus as claimed in claim 1 in which the reaction member comprises two parts, the first part being integral with the cylinder and the second part supporting the first part so that the reaction to hydraulic pressure is transmitted through the first part to the second part.

7. Apparatus as claimed in claim 1 including a spacer block positionable in use between the ends of the rigid members disposed adjacent the external abutment means on the shaft member and the external abutment means of the shaft member.

8. Apparatus as claimed in claim 7 in which there are a series of spacer blocks extending substantially around the whole of the outer circumference of the shaft member.

9. Apparatus as claimed in claim 8 in which the spacer blocks are formed in two adjacent parts, one part being positioned radially further outwards from the axis of the shaft member than the other part.

10. Apparatus as claimed in claim 1 in which the reaction member is rigid with said cylinder.

* * * * *